E. SALTZKORN & L. NICOLAI.
MACHINE FOR CUTTING PASTEBOARD OR THE LIKE.
No. 11,381. Reissued Nov. 7, 1893.
FIG. 1
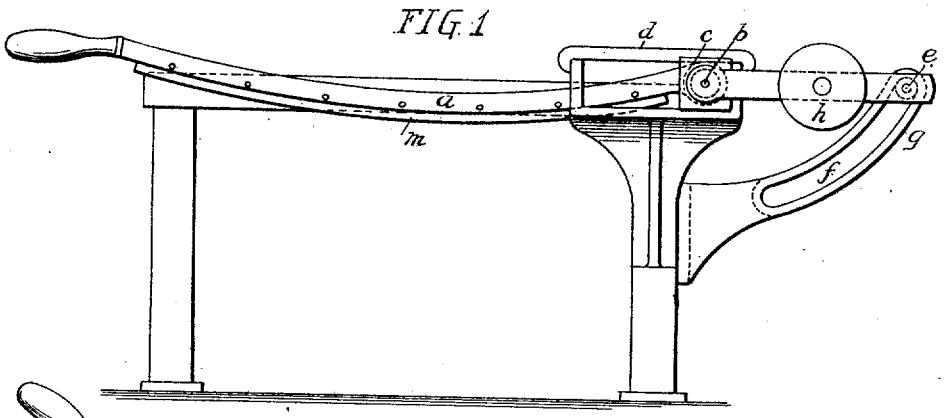
FIG. 4
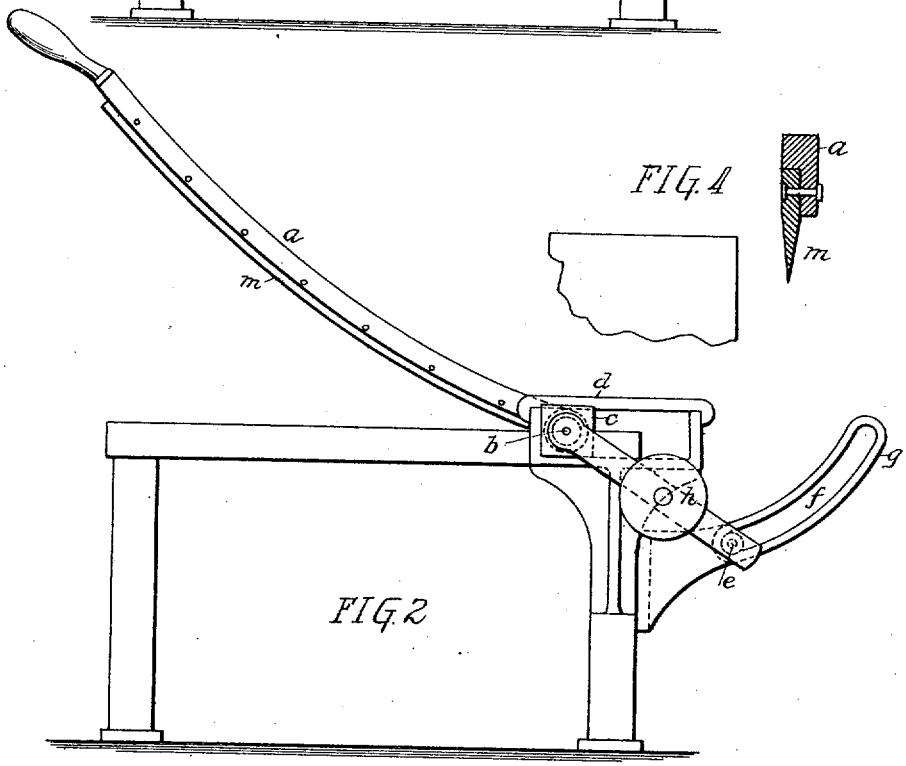
FIG. 2
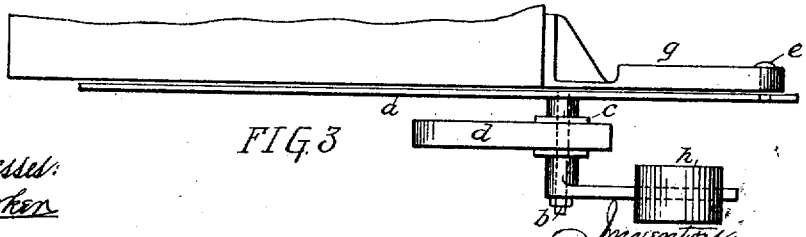
FIG. 3
Witnesses:
Jno. E. Parker
J. Henderson
Inventors:
Emil Saltzkorn & Ludwig Nicolai
by their Attorneys
Howard Pettit.
THE NATIONAL LITHOGRAPHING COMPANY,
WASHINGTON, D. C.

UNITED STATES PATENT OFFICE.

EMIL SALTZKORN AND LUDWIG NICOLAI, OF DRESDEN, GERMANY.

MACHINE FOR CUTTING PASTEBOARD AND THE LIKE.

SPECIFICATION forming part of Reissued Letters Patent No. 11,381, dated November 7, 1893.

Original No. 454,968, dated June 30, 1891. Application for reissue filed June 3, 1893. Serial No. 476,533.

*To all whom it may concern:*

Be it known that we, EMIL SALTZKORN and LUDWIG NICOLAI, both subjects of the King of Saxony, residing at Dresden, Saxony, German Empire, have invented certain new and useful Improvements in Machines for Cutting Pasteboard and the Like, of which the following is a specification.

The subject of the present invention is a machine for cutting pasteboard and the like, to be used in the place of the pasteboard-shears, and has the advantage of producing a smooth and neat cut for several layers of stout pasteboard or the like. This is obtained by means of one knife or blade with a sharp edge, which slides past the supporting plate or table, and thereby receives a drawing motion similar to that which is given to the cutting-knife by the hand. At the time of the downward stroke of the knife it is also laterally reciprocated. For this purpose the knife blade carrier is pivotally secured at its inner end to a sliding block adjusted in horizontally disposed guides; an extension provided on the blade-carrier operating in a fixed cam shaped guide serves to impart the lateral motion and to horizontally reciprocate the knife carrying block in its horizontally disposed guides. By this construction we obtain a smooth neat cut, as before stated, with a saving of power and of time.

Figure 1 is a front elevation of a cutter constructed in accordance with our invention. Fig. 2 is a similar view with the knife raised. Fig. 3 is a top plan view of the front edge, showing the knife. Fig. 4 is a detail section of the knife.

Like letters of reference denote the same parts in all the figures.

The knife-handle or blade-carrier, *a*, is mounted on a bolt or pivot, *b*, carried in a bearing or block, *c*, which is capable of reciprocating in a frame or guide, *d*. The knife handle or lever, *a*, extends beyond the pivot, *b*, or has an extension attached thereto and carries at the projecting end a roller, *e*, which works in the curved slot, *f*, of the bracket, *g*. A weight, *h*, may be secured to the extension of the knife handle or lever, as shown, or to an arm secured on the pivot, *b*.

On raising the knife handle or lever, *a*, the block, *c*, is moved toward the table through the guiding action of the cam-slot, *f*, while a displacement in the opposite direction is effected by pressing the knife-handle downward. A sliding motion is thereby given to the knife, *m*, in cutting, which on account of the thin sharp blade, produces a smooth cut and also requires the application of but little power.

The cam, *f*, instead of being in the form of a slot, may be solid in the form of a bar, and the lever, *a*, may be provided with an eye or other guide for working on it, and, moreover, it may be straight or of other shape than curved, as hereinbefore described.

Having thus described our invention, what we claim, and desire to secure by Letters Patent, is—

1. In a machine for cutting pasteboard, the combination of a rigid frame, fixed horizontally disposed guides provided upon said frame, a sliding block adapted to said guides, a knife pivotally secured at its inner end to said sliding block and having an operating handle provided upon its opposite end, a cam operated arm projecting from the knife-blade at that end opposite to the handle and a cam for horizontally reciprocating said block and knife in the direction of the pivoted end during the cutting operation, substantially as described.

2. In a machine for cutting pasteboard, the combination of a fixed supporting table, a cutting blade rigidly secured to said table, fixed horizontal guides provided upon said table, a movable bearing block adapted to said guides, a knife pivotally secured at one end to said bearing block and having an operating handle at that end opposite to the pivoted end, a rearward extension provided upon said knife and projecting therefrom beyond its pivoted end, a cam rigidly provided upon the supporting frame of the table, with which cam said extension co-operates to move the pivoted blade longitudinally, substantially as described.

3. In a pasteboard-cutting machine, the combination, with the table having the fixed horizontal guides mounted thereon at one end, the cam-bracket also affixed to said table, and the bearing-block movable longitudinally in said guides, of the knife pivoted to said block with the rearward extension cooperating with the cam to move the knife longitudinally, and the counterweight, substantially as described.

4. In a pasteboard cutting machine, the combination of the table, blade-carrier, *a*, knife, *m*, fixed horizontally disposed guides *d*, sliding block, *c*, provided in said fixed guides, *d*, said blade-carrier, *a*, secured at one end pivotally by pivot, *b*, to said block, *c*, rearwardly extending arm secured to the blade-carrier, *a*, and roller, *e*, provided thereon, and cam bracket, *g*, having curved slot, *f*, for engaging the roller, *e*, substantially as described.

In witness whereof we have hereunto set our hands this 1st day of April, A. D. 1893.

EMIL SALTZKORN.
LUDWIG NICOLAI.

Witnesses:
HERNANDO DE SOTO,
PAUL ARRAS.